(12) United States Patent
Sethi et al.

(10) Patent No.: US 11,334,421 B2
(45) Date of Patent: May 17, 2022

(54) METHOD AND APPARATUS TO IDENTIFY A PROBLEM AREA IN AN INFORMATION HANDLING SYSTEM BASED ON LATENCIES

(71) Applicant: DELL PRODUCTS, LP, Round Rock, TX (US)

(72) Inventors: Parminder Singh Sethi, Ludhian (IN); Abhishek Santosh, Bangalore (IN); Anshul Saxena, Bareilly (IN)

(73) Assignee: Dell Products L.P., Round Rock, TX (US)

( * ) Notice: Subject to any disclaimer, the term of this patent is extended or adjusted under 35 U.S.C. 154(b) by 216 days.

(21) Appl. No.: 16/685,303

(22) Filed: Nov. 15, 2019

(65) Prior Publication Data

US 2021/0149760 A1 May 20, 2021

(51) Int. Cl.
*G06F 11/00* (2006.01)
*G06F 11/07* (2006.01)
*G06N 20/00* (2019.01)

(52) U.S. Cl.
CPC ...... *G06F 11/0793* (2013.01); *G06F 11/0757* (2013.01); *G06N 20/00* (2019.01)

(58) Field of Classification Search
CPC .. G06F 11/0793; G06F 11/0757; G06N 20/00
See application file for complete search history.

(56) References Cited

U.S. PATENT DOCUMENTS

| | | | | |
|---|---|---|---|---|
| 10,684,908 B2* | 6/2020 | Poledna | ................ | G06F 11/073 |
| 2004/0003312 A1* | 1/2004 | Smith | ................ | G06F 21/6218 |
| | | | | 714/38.13 |
| 2010/0211959 A1* | 8/2010 | Chan | ................... | G06F 11/0757 |
| | | | | 718/107 |
| 2011/0106940 A1* | 5/2011 | Chauvin | ............. | G06F 11/0757 |
| | | | | 709/224 |
| 2012/0041858 A1 | 2/2012 | Lewis | | |
| 2012/0072779 A1* | 3/2012 | Takai | ................. | G06F 11/0757 |
| | | | | 714/47.1 |
| 2015/0347951 A1 | 12/2015 | Tamblyn et al. | | |
| 2016/0378603 A1 | 12/2016 | Herzi et al. | | |
| 2018/0034720 A1 | 2/2018 | Bell et al. | | |
| 2018/0300194 A1* | 10/2018 | Poledna | ............. | G06F 11/0793 |
| 2019/0104649 A1 | 4/2019 | Clidaras et al. | | |
| 2019/0138287 A1 | 5/2019 | De Capoa et al. | | |
| 2020/0241948 A1* | 7/2020 | Zhang | ................. | G06F 11/0757 |
| 2020/0410284 A1* | 12/2020 | Kallanagoudar | ....... | G06F 12/12 |

* cited by examiner

*Primary Examiner* — Jonathan D Gibson
(74) *Attorney, Agent, or Firm* — Larson Newman, LLP (57) ABSTRACT

An information handling system may obtain timing information for processing among layers of a first client-side information handling system, and compare the timing information to threshold values to provide a comparison. The information handling system may use the comparison to identify an area of the first client-side information handling system in which a problem exists, and initiate remedial action directed to the problem.

20 Claims, 4 Drawing Sheets

METHOD AND APPARATUS TO IDENTIFY A PROBLEM AREA IN AN INFORMATION HANDLING SYSTEM BASED ON LATENCIES

FIELD OF THE DISCLOSURE

The present disclosure generally relates to information handling systems, and more particularly relates to identifying a problem area in an information handling system based on latencies.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system may obtain timing information for processing among layers of a first client-side information handling system, and compare the timing information to threshold values to provide a comparison. The information handling system may use the comparison to identify an area of the first client-side information handling system in which a problem exists, and initiate remedial action directed to the problem.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
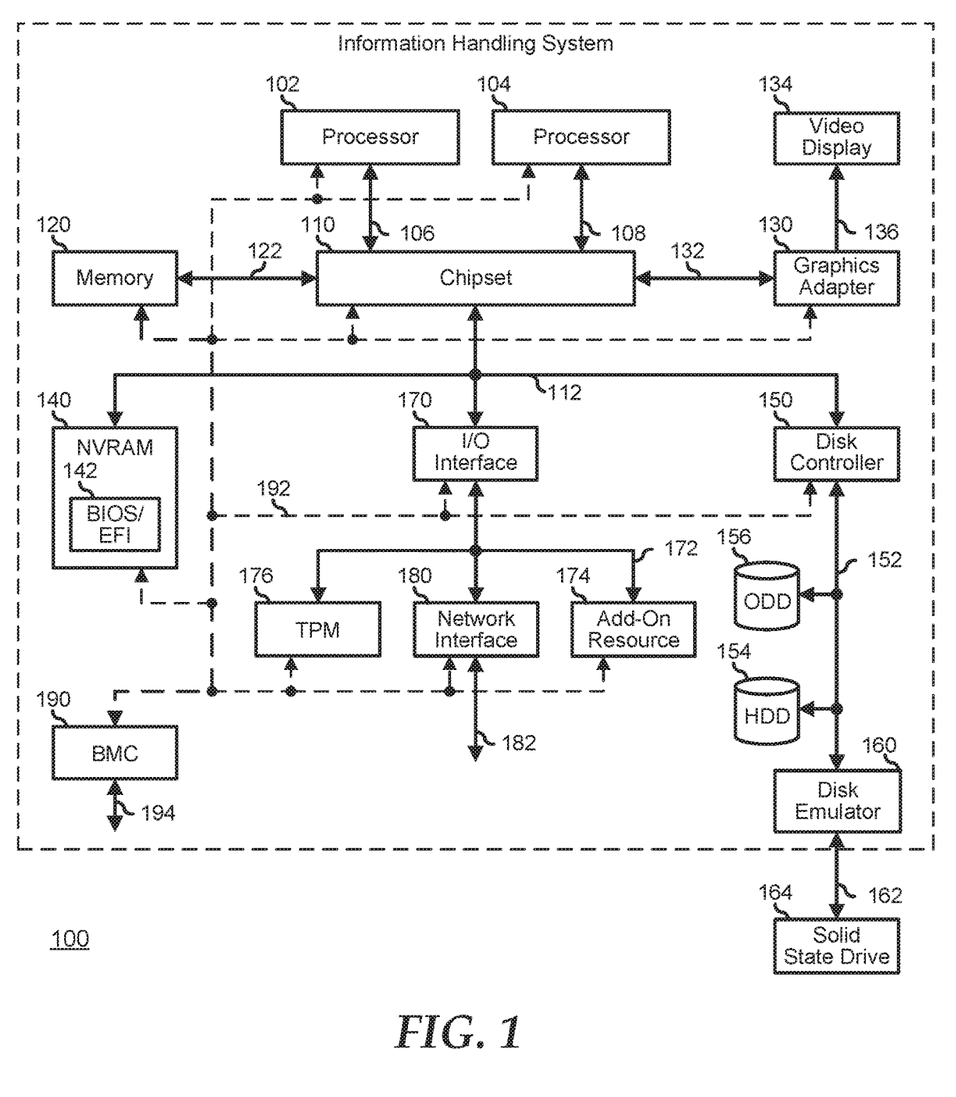
FIG. 1 is a block diagram illustrating an information handling system according to an embodiment of the present disclosure.

FIG. 1 shows a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics adapter 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics adapter 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a Serial Peripheral Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniB and channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

BMC 190 is connected by a management interface 192 to a plurality of system components, such as processor 102, processor 104, memory 120, chipset 110, graphics adapter 130, I/O interface 170, disk controller 150, NVRAM module 140, TPM 176, network interface 180, and add-on resource 174. BMC 190 is connected to an external management interface 194 for platform management by an external IHS.

Figure 2:
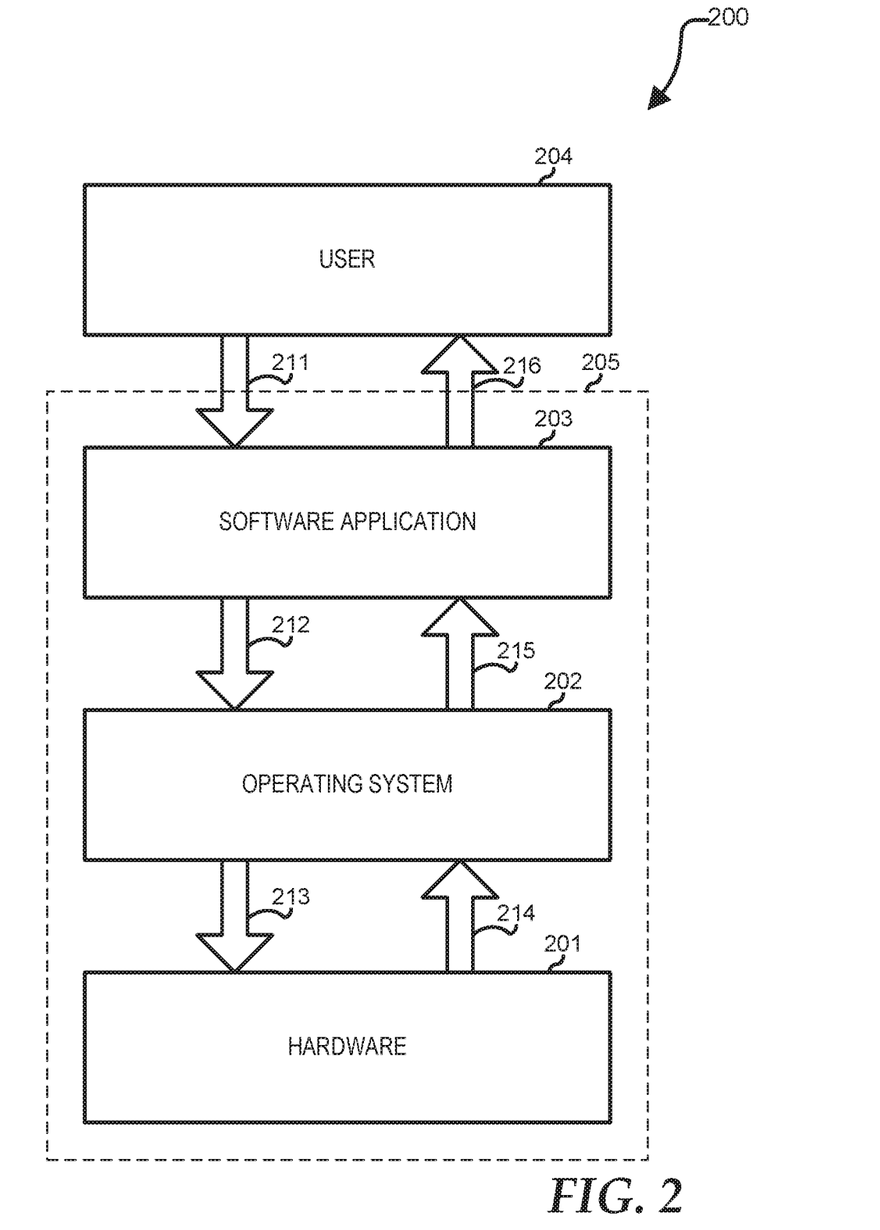
FIG. 2 is a block diagram illustrating layers of an information handling system according to an embodiment of the present disclosure.

FIG. 2 shows layers of an information handling system according to an embodiment of the present disclosure. Information handling system environment 200 includes user 204 and information handling system 205. Information handling system 205 includes hardware 201, operating system 202, and software application 203. A request 211 can be passed from user 204 to software application 203. Consequently, a request 212 can be passed from software application 203 to operating system (OS) 202. Consequently, a request 213 can be passed from OS 202 to hardware 201. In reply, a response 214 can be passed from hardware 201 to OS 202. Consequently, a response 215 can be passed from OS 202 to software application 203. Consequently, a response 216 can be passed from software application 203 to user 204.

Figure 3:
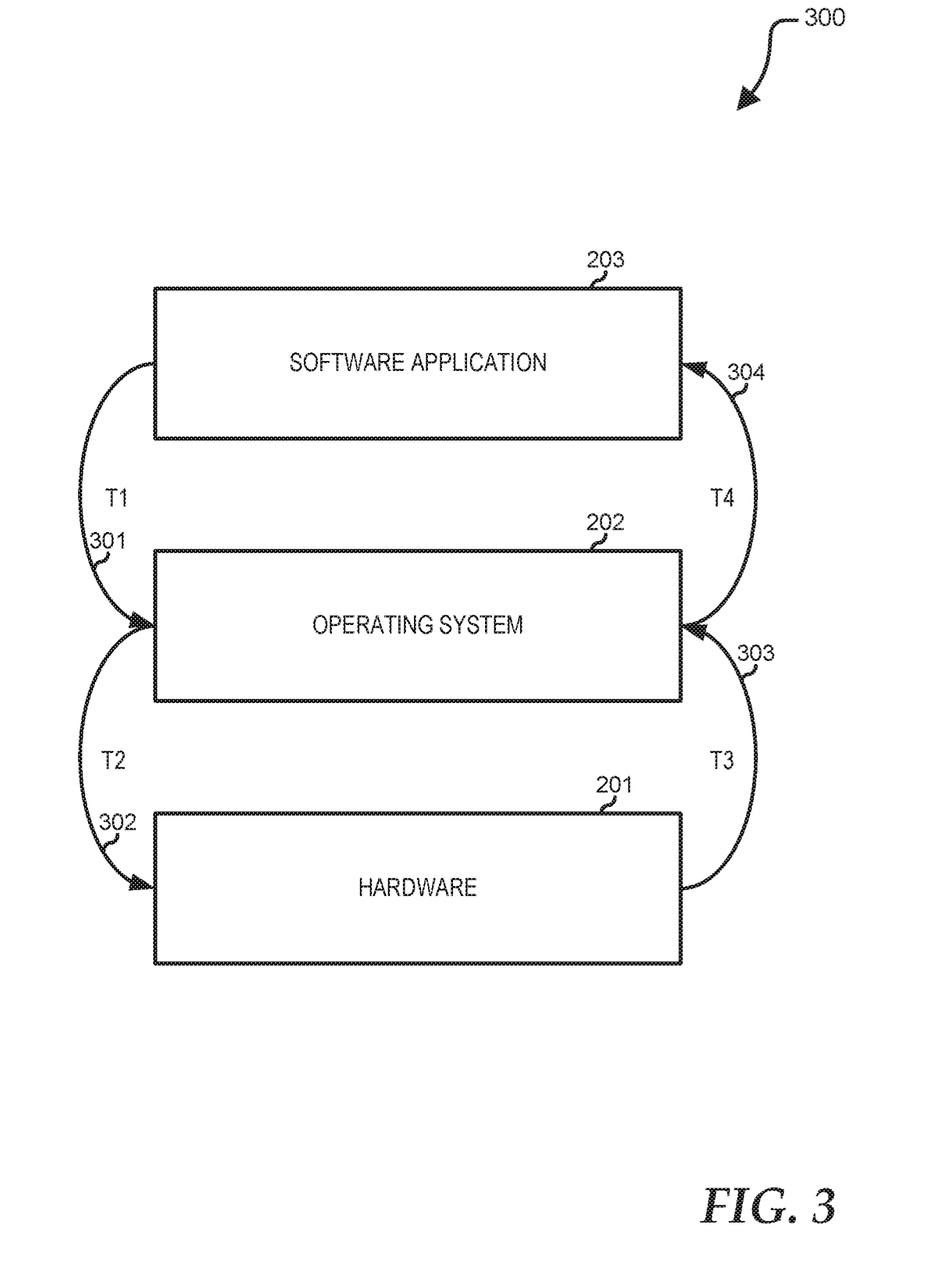
FIG. 3 is a block diagram illustrating a latencies between layers of an information handling system according to an embodiment of the present disclosure.

FIG. 3 shows latencies between layers of an information handling system according to an embodiment of the present disclosure. A latency 301 having a time period T1 exists for a request to pass from software application 203 to OS 202. A latency 302 having a time period T2 exists for a request to pass from OS 202 to hardware 201. A latency 303 having a time period T3 exists for a response to pass from hardware 201 to OS 202. A latency 304 having a time period T4 exists for a response to pass from OS 202 to software application 203.

Figure 4:
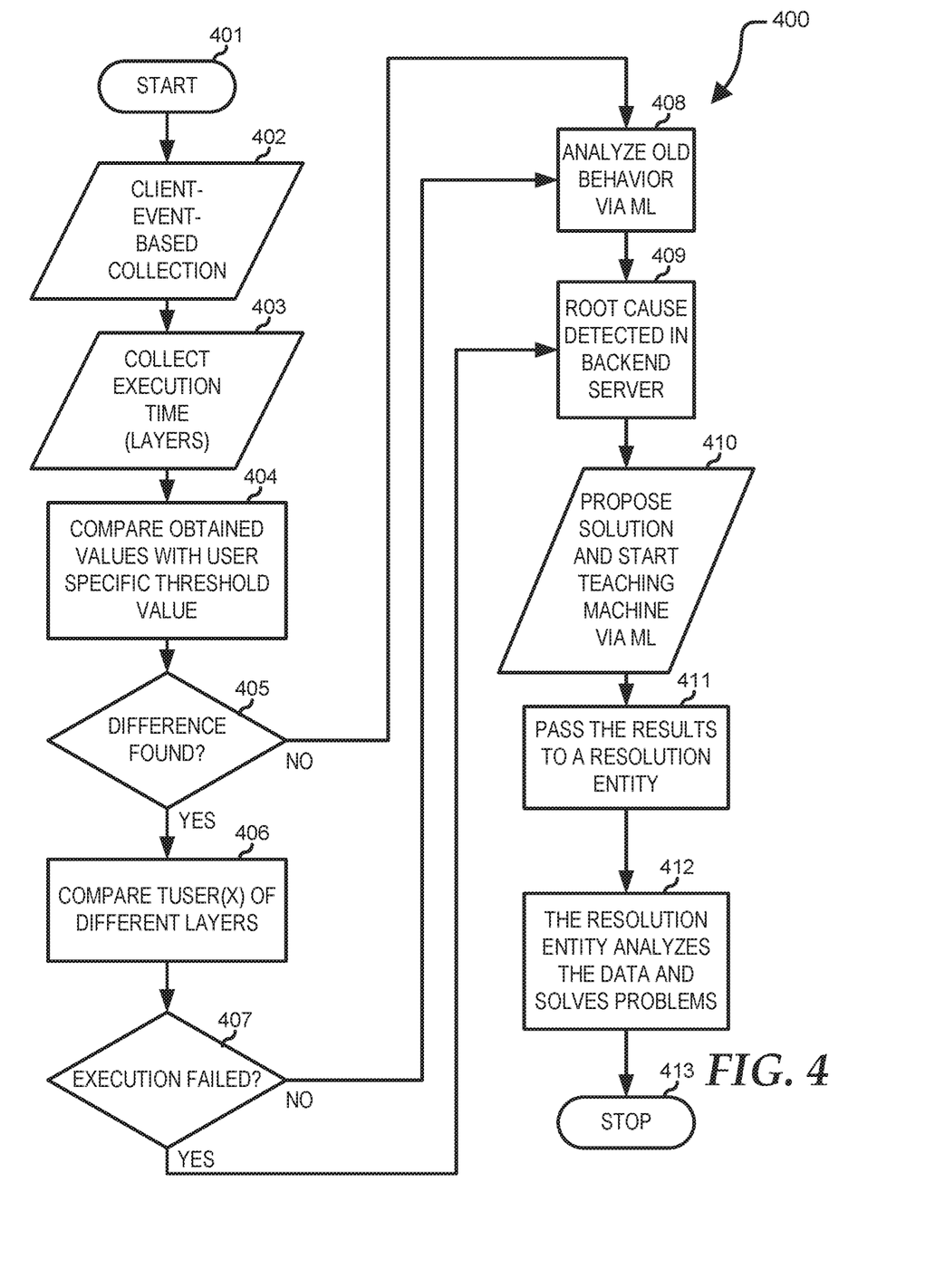
FIG. 4 is a flow diagram illustrating a method according to an embodiment of the present disclosure.

FIG. 4 shows a method 400 that begins at block 401 and continues to block 402. At block 402, a client-event-based collection is performed. Information as to events occurring on a client-side information handling system is collected. As an example, error messages for errors occurring on the client-side information handling system can be collected. From block 402, method 400 continues to block 403. At block 403, timing information, such as latency information, for operations between two or more layers of the client-side information handling system is collected from the client-side information handling system. From block 403, method 400 continues to block 404. At block 404, obtained values are compared with a user-specific threshold value. From block 404, method 400 continues to decision block 405. At decision block, a decision is made as to whether or not a difference is found between the obtained values and the user-specific threshold value (e.g., whether or not the user-specific threshold value has been exceeded). If not, method 400 continues to block 408. If so, method 400 continues to block 406. At block 406, a comparison of the TUSER(X) values of different layers of the client-side information handling system is performed. From block 406, method 400 continues to decision block 407. At decision block 407, based on the comparison of block 406, a decision is made as to whether or not execution of software on the client-side information handling system has failed. If so, method 400 continues to block 409. If not, method 400 continues to block 408. At block 408, old behavior (e.g., behavior as indicated by values obtained prior to any indication of failure) is analyzed using machine learning (ML). From block 408, method 400 continues to block 409. At block 409, a root cause of failure of execution of software on the client-side information handling system is detected in a server-side (e.g., backend) information handling system. From block 409, method 400 continues to block 410. At block 410, based on the detected root cause, a solution is proposed and the teaching of a machine is started via ML. By starting the ML, relationships between such data elements as the obtained values, the detected root cause, and the proposed solution can be learned to improve future performance of the system when faced with similar (or different) problems. From block 410, method 400 continues to block 411. At block 411, the results are passed to resolution entity. From block 411, method 400 continues to block 412. At block 412, the resolution entity analyzes the data and solves the problem. From block 412, method 400 continues to block 413, where method 400 ends.

In diagnosing problems with technological systems, for example, information handling systems, one of the time-consuming tasks is to determine the area in which a problem lies and to forward it to a relevant solution mechanism. If the area in which a problem lies is incorrectly determined, the problem can be dispatched to the wrong solution mechanism for a different type of problem, and solution of the problem can be delayed and complicated, which can result in increasing the turnaround time for providing an appropriate solution to the problem.

Much time addressing technological problems is spent finding out area of the problem, for example, whether the problem is a hardware problem, an operating system (OS) problem, or an application software problem. Any delay in determining the area of the problem leads to increased turnaround time to find the root cause.

In accordance with at least one embodiment, a method and apparatus are provided to identify the area of an IHS within which a problem lies. In accordance with at least one embodiment, the area may be selected from a group consisting of the hardware of the IHS, the operating system of the IHS, and a software application of the IHS. In accordance with at least one embodiment, determination of the area in which problem lies can be followed by selective automatic dispatch of the problem to a particular problem resolution entity among a plurality of problem resolution entities.

In accordance with at least one embodiment, a method and apparatus are provided for a client-side IHS to gather information indicative of a location of a problem on the client-side IHS. On a client-side IHS, information regarding the flow of a user's request and the response of the IHS to the request can be collected. The user's request may, for example, be a request made via a software application. The software application may process the request and initiate action to be taken by the OS. The OS may, in turn, initiate action to be taken in a hardware-level component of the IHS. The hardware-level component may return a result to the OS. The OS may, in turn, return the result to the software application. The software application may cause action observable to the user. As such a sequence progresses, periods of time elapse from one stage to the next. The time gaps between the different layers for a single user's request and its response can be measured and collected, for example, by a system management application operating on the IHS. As the timing data are measured and collected during operation, they can be used to establish default threshold values of at least one combination of at least two of a time $t1$ for a request to be sent from a software application to the OS, a time $t2$ for a request to be sent from the OS to the hardware of the IHS, a time $t3$ for a reply to be sent from the hardware of the IHS to the OS, and a time $t4$ for a reply to be sent from the OS to the software application. The default threshold values can be specific to a particular user's IHS, generalized for a plurality of users' IHSs, or generalized for a plurality of users' IHSs but adjusted to tailor them to a particular user IHS. The default threshold values can be promulgated in conjunction with a system management application. The default threshold values can change, for example, being modified according to a particular user's way of using that particular user's IHS. Thus, user-specific threshold values can be utilized.

In accordance with at least one embodiment, a system management application can collect measurements of the time periods between different layers for a combination of at least two requests or replies. The system management application can upload the measurements to a backend server for storage, analysis, and determination of default threshold values. For example, the collected values can be analyzed with respect to an operational status of a client-side IHS from which they are obtained. For example, the client-side IHS may have a fully operational status, from which a first set of measurements are collected, but then descend into a degraded performance status, from which a second set of measurements are collected. A relationship of the second set of measurements to the first set of measurements can be used to determine the default threshold values. Such measurements and determinations can be made with respect to a particular user's IHS or to a plurality of users' IHSs. In the latter case, the plurality of data sets can be considered as part of an overall data set collected from different IHSs to analyze and determine the generic default threshold values applicable to a plurality of IHSs.

In accordance with at least one embodiment, the generic default threshold values can be adjusted or replaced to assure applicability to a particular IHS. As the generic default threshold values are obtained (e.g., averaged) from a large number of measurements of a large number of IHSs, there may be outlier IHSs for which adjusted values may provide better results. A determination of whether to use the generic default threshold values or to adjust the generic default threshold values can be made by comparing the measurements obtained from a particular user's IHS to the default threshold values. If the comparison indicates the particular user's IHS has measurements during normal operation that are inconsistent with the measurements during normal operation of a plurality of IHSs from which the default threshold values are obtained, it can be concluded that the default threshold values may not be ideal for determining when measurements of the particular user's IHS indicate abnormal operation, and the decision can be made to adjust the generic default threshold values to provide adjusted generic default threshold values tailored to the particular user's IHS. The collection of measurement data and the use of generic default threshold values can begin immediately upon implementation of an embodiment, and the adjusted generic default threshold values can continue to improve performance as usage of the particular user's IHS continues. The adjusted generic default threshold values can be used as specific threshold values, or specific threshold values can be established via a different route, for example, by evaluating measurement data from the particular user's IHS without dependence on generic default threshold values. The adaptive capabilities of at least one embodiment can provide improved results over time.

In accordance with at least one embodiment, a method and apparatus are provided for a server-side IHS to receive information indicative of a location of a problem on the client-side IHS. As an example, the information may be in the form of measurements of timing of processing of information for different areas of the client-side IHS. For example, the information may include the timing information comprising at least two of the t1, t2, t3, and t4 time periods described above. The timing information can be obtained during both a fully operational status and a degraded performance status of a client-side IHS. The timing information can be received from a single IHS or from a plurality of IHSs. Collected values from a client-side IHS can be used by a server-side (e.g., backend) IHS to guide dispatch of a problem with the client-side IHS for resolution of the problem.

In accordance with at least one embodiment, the following are collected values which can be used, as may be obtained from measurements made on a client-side IHS:

T User (Current)={t2, t3, t4}->user's current behavior
T Normal=user specific threshold value Therefore, the likelihood percentage will be calculated as follows:

Probability (%) that issue is with the app
[(TUSER{1}−TNORMAL)/TUSER {1)]*100

Probability (%) that issue is with the OS
[(TUSER{2}−TNORMAL)/TUSER {2)]*100

Probability (%) that issue is with the h/w
[(TUSER{3}−TNORMAL)/TUSER {3)]*100 where TUSER(X) can have values for X as follow:
X=1: time lapse between Application and OS layer
X=2: time lapse between OS and hardware layer In accordance with at least one embodiment, an area of a problem within an IHS can be localized quickly and efficiently without having to perform traditional responsive remote access on the IHS to begin a process of finding the area of the problem within the IHS. Implementation of at least one embodiment can greatly reduce the time needed to solve a problem with an IHS by eliminating a need to examine areas of the IHS where the problem does not exist but by instead identifying the specific area of the IHS where the problem does exist.

In accordance with at least one embodiment, at least two aspects of problem solving can be provided to expedite and simplify the solution of a problem in the IHS. Firstly, the area in which the problem exists can be identified. For example, the layer (e.g., software application, OS, or hardware) of the IHS at which the problem exists can be identified. Secondly, as the particular nature of the problem may have characteristics that yield recognizable effects on the timing measurements, the type of problem can, in at least some cases, be identified. The determination of the type of the problem can be correlated with the identified area of the problem, and correlation between the type and the area can provide confirmation (e.g., cross-confirmation) of those determinations. A lack of correlation between the type and the area can be used to cause further measurement, further analysis, indication of the lack of correlation, the like, or combinations thereof.

In accordance with at least one embodiment, a method comprises obtaining timing information for processing among layers of a first client-side information handling system (IHS); comparing the timing information to threshold values to provide a comparison; using the comparison to identify an area of the first client-side IHS in which a problem exists in the first client-side IHS; and initiating remedial action directed to the problem in the area of the first client-side IHS. In accordance with at least one embodiment, the area is selected from a group consisting of a software application, an operating system (OS), and a hardware component of the first client-side IHS. In accordance with at least one embodiment, the timing information comprises a first time period representing a latency of a first request from the software application to the OS and a second time period representing a latency of a second request from the OS to the hardware component. In accordance with at least one embodiment, the timing information comprises a third time period representing a latency of a first response from the hardware component to the OS and a fourth time period representing a latency of a second response from the OS to the software application. In accordance with at least one embodiment, the threshold values are generic default threshold values generated from processing of information regarding timing obtained from a plurality of client-side IHSs. In accordance with at least one embodiment, the threshold values are user-specific threshold values generated by modifying generic default threshold values generated from the processing of information regarding timing obtained from a plurality of client-side IHSs, wherein the modifying comprises adjusting the generic default threshold values based on specific information of the first client-side IHS. In accordance with at least one embodiment, the initiating remedial action directed to the problem in the area of the first client-side IHS is performed using machine learning (ML).

In accordance with at least one embodiment, an information handling system (IHS) comprises a memory; and a processor, the processor configured to obtain timing information for processing among layers of a first client-side information handling system (IHS), to compare the timing information to threshold values to provide a comparison, to use the comparison to identify an area of the first client-side IHS in which a problem exists in the first client-side IHS, and to initiate remedial action directed to the problem in the area of the first client-side IHS. In accordance with at least one embodiment, the area is selected from a group consisting of a software application, an operating system (OS), and a hardware component of the first client-side IHS. In accordance with at least one embodiment, the timing information comprises a first time period representing a latency of a first request from the software application to the OS and a second time period representing a latency of a second request from the OS to the hardware component. In accordance with at least one embodiment, the timing information comprises a third time period representing a latency of a first response from the hardware component to the OS and a fourth time period representing a latency of a second response from the OS to the software application. In accordance with at least one embodiment, the threshold values are generic default threshold values generated from processing of information regarding timing obtained from a plurality of client-side IHSs. In accordance with at least one embodiment, the threshold values are user-specific threshold values generated by modifying generic default threshold values generated from the processing of information regarding timing obtained from a plurality of client-side IHSs, wherein the modifying comprises adjusting the generic default threshold values based on specific information of the first client-side IHS. In accordance with at least one embodiment, the initiating remedial action directed to the problem in the area of the first client-side IHS is performed using machine learning (ML).

In accordance with at least one embodiment, a method comprises obtaining timing information for processing among layers of a first client-side information handling system (IHS), the timing information comprising at least two of a first time period representing a latency of a first request from a software application of the client-side IHS to an operating system (OS) of the client-side IHS, a second time period representing a latency of a second request from the OS to a hardware component of the client-side IHS, a third time period representing a latency of a first response from the hardware component to the OS, and a fourth time period representing a latency of a second response from the OS to the software application; comparing the timing information to threshold values to provide a comparison; using the comparison to identify an area of the first client-side IHS in which a problem exists in the first client-side IHS; and initiating remedial action directed to the problem in the area of the first client-side IHS. In accordance with at least one embodiment, the area is selected from a group consisting of the software application, the operating system (OS), and the hardware component of the first client-side IHS. In accordance with at least one embodiment, the threshold values are generic default threshold values generated from processing of information regarding timing obtained from a plurality of client-side IHSs. In accordance with at least one embodiment, the threshold values are user-specific threshold values generated by modifying generic default threshold values generated from the processing of information regarding timing obtained from a plurality of client-side IHSs, wherein the modifying comprises adjusting the generic default threshold values based on specific information of the first client-side IHS. In accordance with at least one embodiment, the initiating remedial action directed to the problem in the area of the first client-side IHS is performed using machine learning (ML). In accordance with at least one embodiment, the generic default threshold values are downloaded to the client-side IHS.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device).

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    measuring timing information for processing among layers of a first client-side information handling system (IHS), wherein the timing information includes a first time period representing a first latency of a first request from a software application to an operating system (OS) and a second time period representing a second latency of a second request from the OS to a hardware component;
    comparing the timing information to threshold values to provide a comparison;
    in response to determining that there are differences between the timing information and the threshold values, using the comparison to identify an area of the first client-side IHS in which a problem exists, wherein the identification of the area of the first client-side IHS in which the problem exists includes calculating a first probability that the problem exists in the OS and a second probability that the problem exists in the hardware component, wherein the first probability is calculated based on the first time period and the second probability is calculated based on the second time period;

dispatching of the problem to a problem resolution entity; and initiating, by the problem resolution entity, remedial action directed to the problem in the area of the first client-side IHS, wherein the problem exists in the area with a higher probability between the first probability and the second probability.

2. The method of claim 1, wherein the area is selected from a group consisting of the software application, the (OS), and the hardware component of the first client-side IHS.

3. The method of claim 2, wherein the first probability is calculated based on a difference between the first time period and a first threshold value, and wherein the difference is divided by the first threshold value.

4. The method of claim 2, wherein the timing information comprises a third time period representing a latency of a first response from the hardware component to the OS and a fourth time period representing another latency of a second response from the OS to the software application.

5. The method of claim 1, wherein the threshold values are generic default threshold values generated from processing of the timing information obtained from a plurality of client-side IHSs.

6. The method of claim 1, wherein the threshold values are user-specific threshold values generated by modifying generic default threshold values generated from processing of the timing information obtained from a plurality of client-side IHSs, wherein the modifying comprises adjusting the generic default threshold values based on specific information of the first client-side IHS.

7. The method of claim 1, wherein the initiating of the remedial action directed to the problem in the area of the first client-side IHS is performed using machine learning (ML).

8. An information handling system (IHS) comprising:
a memory; and
a processor in communication with the memory, the processor configured to obtain timing information for processing among layers of a first client-side information handling system (IHS), wherein the timing information includes a first time period representing a first latency of a first request from a software application to an operating system (OS) and a second time period representing a second latency of a second request from the OS to a hardware component, to compare the timing information to threshold values to provide a comparison, in response to determining that there are differences between the timing information and the threshold values, to use the comparison to identify an area of the first client-side IHS in which a problem exists, wherein the identification of the area of the first client-side IHS in which the problem exists includes calculating a first probability that the problem exists in the OS and a second probability that the problem exists in the hardware component, wherein the first probability is calculated based on the first time period and the second probability is calculated based on the second time period, to dispatch the problem to a problem resolution entity; and to initiate remedial action, by the problem resolution entity, directed to the problem in the area of the first client-side IHS, wherein the problem exists in the area with a higher probability between the first probability and the second probability.

9. The IHS of claim 8, wherein the area is selected among the layers of the first client-side IHS consisting of the software application, the (OS), and the hardware component of the first client-side IHS.

10. The IHS of claim 9, wherein the first probability is calculated based on a difference between the first time period and a first threshold value, and wherein the difference is divided by the first threshold value.

11. The IHS of claim 9, wherein the timing information comprises a third time period representing a latency of a first response from the hardware component to the OS and a fourth time period representing another latency of a second response from the OS to the software application.

12. The IHS of claim 8, wherein the threshold values are generic default threshold values generated from processing of the timing information obtained from a plurality of client-side IHSs.

13. The IHS of claim 8, wherein the threshold values are user-specific threshold values generated by modifying generic default threshold values generated from processing of the timing information obtained from a plurality of client-side IHSs, wherein the modifying comprises adjusting the generic default threshold values based on specific information of the first client-side IHS.

14. The IHS of claim 8, wherein the initiating of the remedial action directed to the problem in the area of the first client-side IHS is performed using machine learning (ML).

15. A method comprising:
obtaining timing information for processing among layers of a first client-side information handling system (IHS), the timing information including at least two of a first time period representing a first latency of a first request from a software application of the first client-side IHS to an operating system (OS) of the first client-side IHS, a second time period representing a second latency of a second request from the OS to a hardware component of the first client-side IHS, a third time period representing a third latency of a first response from the hardware component to the OS, and a fourth time period representing a fourth latency of a second response from the OS to the software application;
comparing the timing information to threshold values to provide a comparison;
in response to determining that there are differences between the timing information and the threshold values, using the comparison to identify an area in which a problem exists in the first client-side IHS, wherein the identification of the area of the first client-side IHS in which the problem exists includes calculating a first probability that the problem exists in the OS and a second probability that the problem exists in the hardware component, wherein the first probability is calculated based on the first time period and the second probability is calculated based on the second time period;
dispatching of the problem to a problem resolution entity; and
initiating, by the problem resolution entity, remedial action directed to the problem in the area of the first client-side IHS, wherein the problem exists in the area with a higher probability between the first probability and the second probability.

16. The method of claim 15, wherein the area is selected from a group consisting of the software application, the OS, and the hardware component of the first client-side IHS.

17. The method of claim 15, wherein the threshold values are generic default threshold values generated from processing of the timing information obtained from a plurality of first client-side IHSs.

18. The method of claim 15, wherein the threshold values are user-specific threshold values generated by modifying generic default threshold values generated from processing of the timing information obtained from a plurality of client-side IHSs, wherein the modifying comprises adjusting the generic default threshold values based on specific information of the first client-side IHS.

19. The method of claim 15, wherein the initiating of the remedial action directed to the problem in the area of the first client-side IHS is performed using machine learning (ML).

20. The method of claim 17, wherein the generic default threshold values are downloaded to the first client-side IHS.

* * * * *

UNITED STATES PATENT AND TRADEMARK OFFICE
CERTIFICATE OF CORRECTION

PATENT NO. : 11,334,421 B2
APPLICATION NO. : 16/685303
DATED : May 17, 2022
INVENTOR(S) : Sethi et al.

It is certified that error appears in the above-identified patent and that said Letters Patent is hereby corrected as shown below:

In the Claims

Column 11, Line 10: Please change "(OS)," to --OS,--

Signed and Sealed this
Thirteenth Day of September, 2022

Katherine Kelly Vidal
*Director of the United States Patent and Trademark Office*